United States Patent

[11] 3,553,507

| [72] | Inventor | Pierre Etienne Bessiere<br>Golf-de-Saint-Nom-la-Breteche, France |
|---|---|---|
| [21] | Appl. No. | 798,732 |
| [22] | Filed | Feb. 12, 1969 |
| [45] | Patented | Jan. 5, 1971 |
| [73] | Assignee | Labavia-S.G.E.<br>Paris, France |
| [32] | Priority | Feb. 29, 1968, May 2, 1968 |
| [33] | | France |
| [31] | | Nos. 141866 and 150329 |

[54] RETARDERS
15 Claims, 10 Drawing Figs.

[52] U.S. Cl. .................................................. 310/93,
310/268
[51] Int. Cl. .................................................. H02k 49/12
[50] Field of Search .......................................... 310/93,
105, 268, 103

[56] References Cited
UNITED STATES PATENTS

| 2,745,974 | 5/1956 | Oetzel ......................... | 310/93 |
| 2,830,206 | 4/1958 | Bessiere ...................... | 310/93 |

*Primary Examiner*—D. X. Sliney
*Attorney*—Fleit, Gipple & Jacobson

ABSTRACT: The retarder is self-contained and comprises a stator including an annular portion interposed between two rotor elements of a rotor fixed to a shaft rotatably mounted within a bore in a central portion of the stator by taper roller bearings adjacent opposite ends of the bore. The central portion of the stator is recessed with respect to the annular portion. Transmission coupling means lie in this recess and are connected to the adjacent rotor element by one or more members bent into the recess in the stator to define a corresponding recess in the rotor to accommodate part of a transmission connected to these coupling means.

RETARDERS

The invention relates to self-contained retarders, such as are used, for example to slow down the movement of a motor vehicle. The term "self-contained retarder" means a retarder including a stator and a rotor mounted on a shaft journaled for rotation in the stator and having at its two ends coupling means whereby the rotor, and together therewith the rest of the retarder, can be inserted in any transmission at the most suitable place thereof.

In prior art self-contained retarders the portion of the stator in which the shaft of the retarder rotor is mounted, has a considerable axial length so that the insertion of a retarder in a transmission considerably increases the length of the transmission. This is a disadvantage, as, in certain motor vehicles, for instance the length of the transmission is insufficient to allow the insertion of a prior art retarder.

It is an object of the invention to provide a self-contained retarder which can be inserted in a transmission with less increase in length of the transmission than with prior self-contained retarders.

According to the invention we provide a self-contained retarder comprising a stator including an annular portion interposed between two rotor elements of a rotor fixed to a shaft rotatably mounted within a bore in a central portion of the stator by taper roller bearings adjacent opposite ends of the bore, the rollers of each bearing having their rotary axes inclined towards the rotary axis of said shaft towards the other bearing, said central portion of the stator having at last one axially extreme end offset axially inwardly from the position of the adjacent axial end of said annular portion to provide a central recess at the corresponding end of the stator, said shaft having at opposite ends coupling means for connection to a transmission, the coupling means adjacent said end of the stator lying within said recess and being connected to the rotor element adjacent said end of the stator by one or more connecting members bent into said recess in the stator to define a corresponding recess in the rotor to accommodate part of a transmission connected to said coupling means.

In a particularly advantageous embodiment of the invention, said coupling member comprises a plate fixed to one end of said shaft substantially in the central plane of said annular portion, both rotor elements being attached to said plate by similar members, to define a similar recess at opposite end of the rotor, said bore in the stator being formed by a bush extending into one of said recesses and the other of said recesses being arranged to accommodate a transmission element.

Various embodiments of the invention will now be described with reference to the accompanying drawings, wherein.

Figure 1:
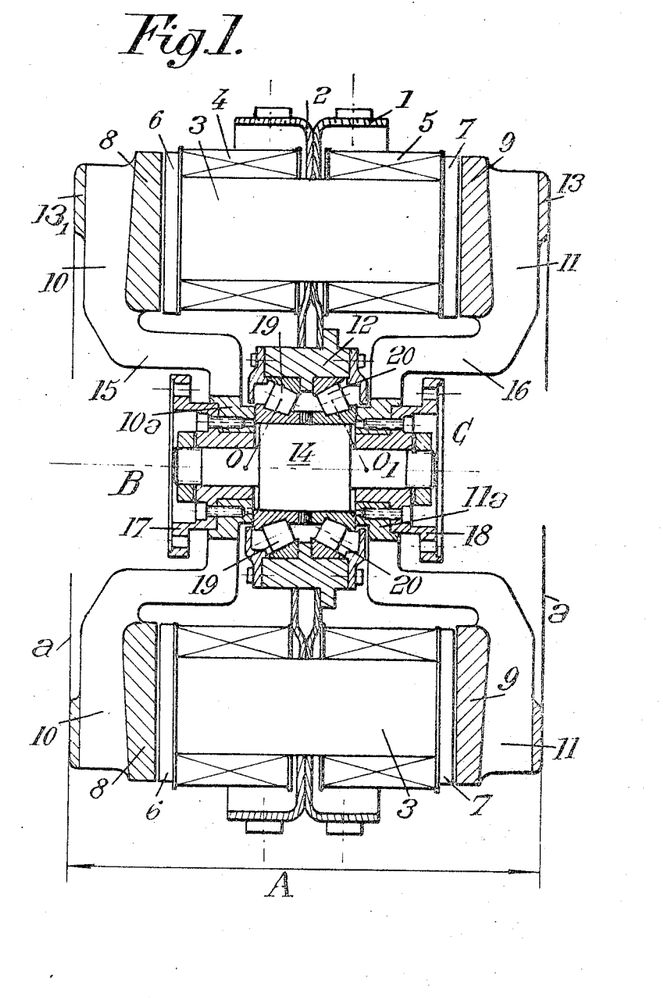
FIG. 1 is a view in axial section of one form of retarder according to the invention.

Referring to FIG. 1 an eddy current retarder includes a stator which comprises a support 1 adapted to be attached, for instance, to the chassis of a vehicle on which the retarder is to be mounted. The support 1 includes a plate 2 to which cores 3 of a plurality of electromagnets of an annular electromagnetic inductor are attached. The cores 3 extend paraxially of the retarder and bear on either side of the plate 2 windings 4, 5 and pole pieces 6, 7 so as to produce on either side of the plate 2 two rings of electromagnets. In each ring the adjacent electromagnets are of opposite polarity.

If a current flows through the windings of the stator-inductor, they set up eddy currents in two rotor elements taking the form of annular discs 8, 9 made of a ferromagnetic material which are disposed on either side of the stator-inductor and form part of the rotor. These rotor elements carry integral fins 10, 11 which are disposed on the outer faces of the discs 8, 9 and which during the rotation of the rotor, produce currents of cooling air in known manner. The ends of the fins 10, 11 remote from the discs 8, 9 are interconnected by small annular plates $13_1$, 13.

A bush 12 of short axial length compared with the inductor is attached to the stator plate 2 at its center and the arrangement is such that a recess is formed within the inductor at opposite axial ends of the stator. The members 8, 10, $13_1$, 9, 11, 13 of the rotor are connected to a shaft 14 by a plurality of integral arms 15 and 16 respectively at opposite ends of the retarder, the arms 15 and 16 being bent into the recess at the corresponding end of the stator and being integral with hubs 10a and 11a respectively fixed to opposite ends of the shaft 14. The sets of arms 15, 16 each define a kind of openwork bell, so as to produce in opposite ends of the rotor a recess B, C respectively within the axial limits of the stator. Fixed to the hubs 10a and 11a respectively are coupling plates 17, 18 of the retarder each adapted to be fixed to a portion of a universal joint which the transmission, in which the retarder is interposed, comprises on one side thereof or on both sides thereof. The recesses B and C are such that they can accommodate part of such universal joints.

The rotor shaft 14 is rotatably supported in a bore in the bush 12 by taper roller bearings 19, 20 of opposite inclinations, the rotary axes of the rollers of each bearing being inclined towards the axis of the shaft 14 and the other bearing. As a result of this inclination, the bearing centers $0-0_1$ of these bearings are located on the outside of the bush 12, thus substantially increasing the stability of the assembly. Preferably, taper roller bearings are used in which the axes of the rollers are inclined in relation to the rotary axis of the bearings at a considerable angle, for instance 24°—45°, preferably about 30°. As a result of the use of taper bearings whose rollers have such a strong inclination, the axial length of the bush 12 can be reduced to a value which is only slightly greater than the sum of the axial widths of the two bearings.

These bearings both ensure the stability of the assembly and absorb the transmission jerks coming from each side of the retarder. The increased length of the transmission due to the insertion therein of the retarder of FIG. 1 reaches the minimum value without the stability of the retarder assembly becoming inadequate.

Figure 2:
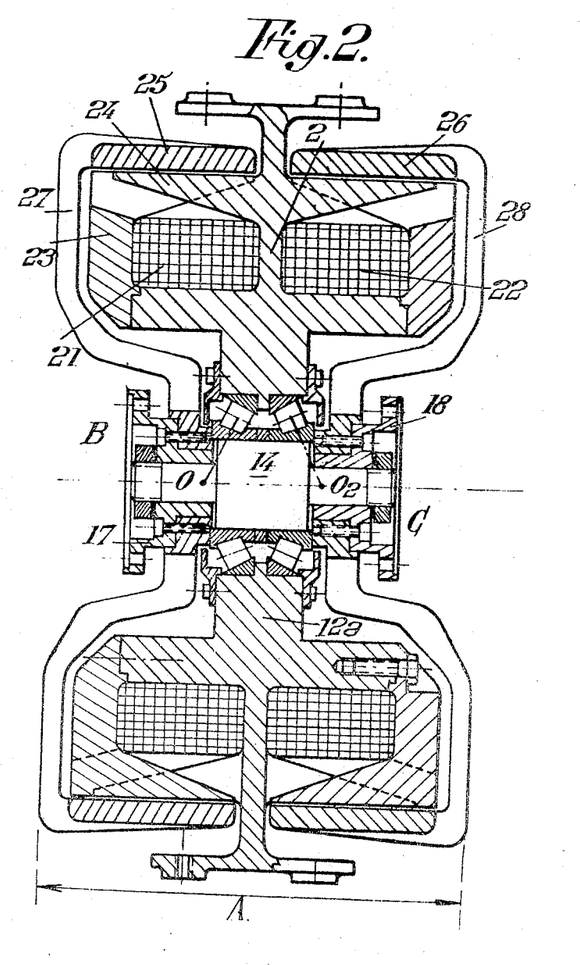
FIG. 2 is a view in axial section of another form of retarder according to the invention.

The retarder shown in FIG. 2 differs from that shown in FIG. 1 mainly in that in the former the stator inductor, instead of comprising two rings of separate electromagnets on either side of the central plate 2, comprises only two annular windings 21, 22 disposed on either side of the plate 2 and coaxial with the shaft 14 and each located in an annular recess between overlapping pole fingers 23, 24 of a generally annular stator member 2 forming two cylindrical zones of pole faces of alternate polarity on the exterior of the member 2. These zones have their centers on the axis of the rotor, which comprises rotor elements comprising cylindrical rings 25, 26 made of a ferromagnetic material which encircle the member 2 on either side of a central supporting web thereof adapted to be secured to the body of a vehicle. When the rotor is rotating eddy currents are set up when the windings 21, 22 are energized by an electric current. The rings 25, 26 are attached to the retarder shaft 14 by members 27, 28 which are bent into recesses formed at opposite ends of the stator on either side of a central web 12a of the stator of reduced axial length compared with the member 2, the members 27, 28 defining recesses B and C at opposite ends of the retarder in a manner completely similar to the members 10, 15 and 11, 16 of the retarder shown in FIG. 1. Advantageously, the members 27, 28 also act as fins for cooling the retarder. The sets of members 27 and 28 are each integral with hubs secured to a shaft 14 in the same manner as the hubs of the arms 15 and 16 of FIG. 1, the shaft 14 being rotatably mounted in a bore in the web 12a in the same way as the shaft 14 in FIG. 1 is mounted in the bush 12 of FIG. 1, corresponding numerals applying to corresponding parts.

As can be seen from FIG. 2, the retarder shown therein has the same advantages as the retarder shown in FIG. 1, since the spaces B, C, which are inside the axial limits of the retarder, can receive not only the retarder coupling plates 17 and 18, but also at least a portion of the transmission elements which are attached to the coupling plates and can be formed inter alia by universal joints.

Figure 3:
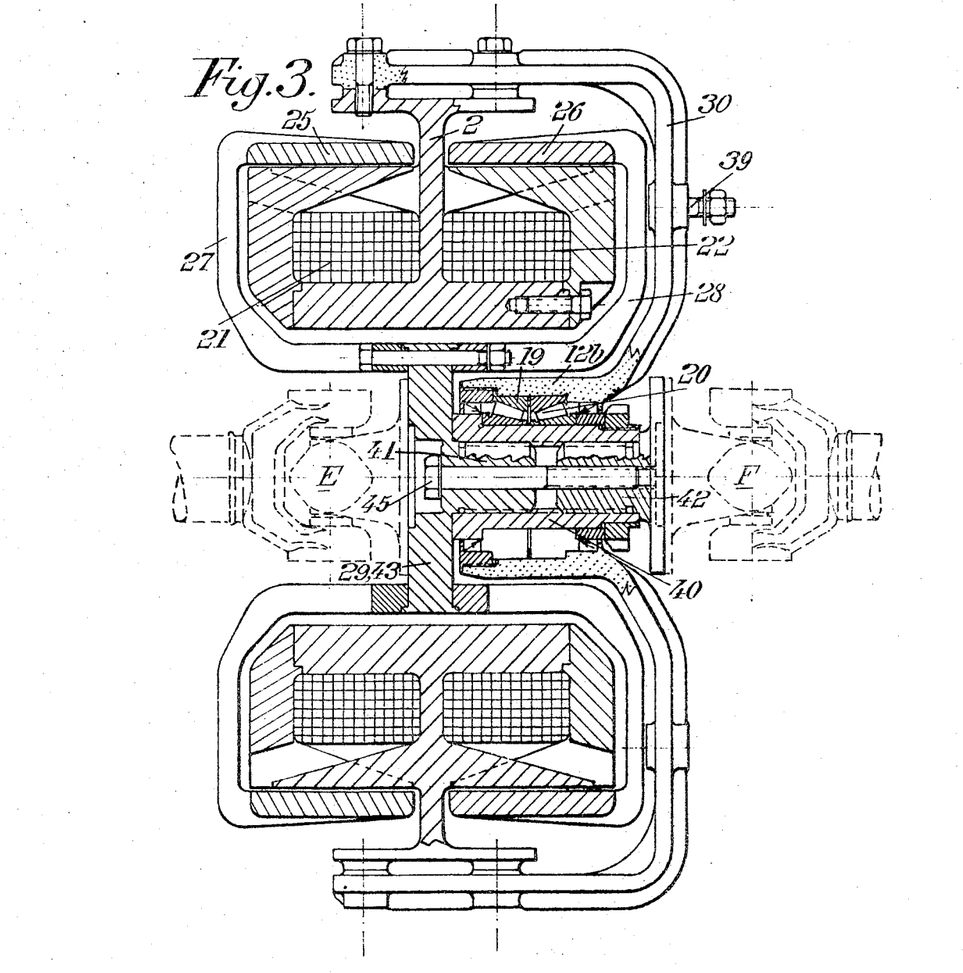
FIG. 3 is a view in axial section of yet another form of retarder according to the invention.
Figure 4:
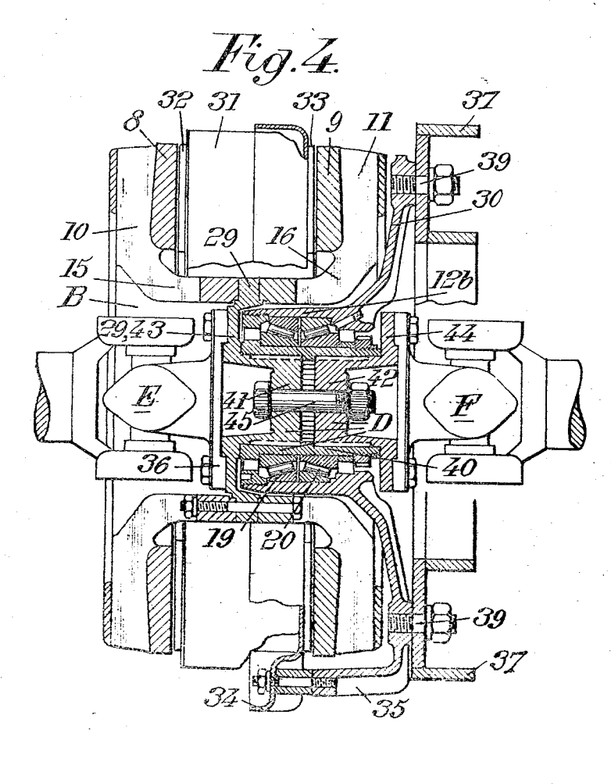
FIG. 4 is a view in axial section of yet another form of retarder according to the invention.

In the embodiment of FIG. 3 the annular inductor is similar to that in FIG. 2 as are the rotor elements 25 and 26, while in the embodiment of FIG. 4 the inductor is similar to that of FIG. 1 and the rotor elements 8, 9 are similar to the elements 8, 9 in FIG. 1. In the embodiments of both FIG. 3 and FIG. 4 the rotor elements are supported by integral arms which are bent into the recess at each end of the inductor and are fixed to a plate 29 which is perpendicular to the axis of rotation of the rotor and is substantially in the central plane of the inductor. Corresponding parts in FIGS. 1 and 4, and 2 and 3, have the same reference numerals. The plate 29 is fixed at one end of a shaft D which extends axially of the retarder, on one side only of the plate 29. The shaft is journaled, by taper roller bearings 19, 20 having the same characteristics as those shown in FIGS. 1 and 2, inside a bush 12b disposed in the recess defined by the bent members 11, 16 or 28 of one of the rotor elements, the bush 12b being integral with a support 30 for the inductor, and the axial length of the bush 12b not substantially exceeding the depth of said recess. The support 30, which extends around the rotor element inside which the bush 12b is received, is connected to the inductor of the stator by bolts or the like. The support is also adapted to be attached to the vehicle chassis or a part of the vehicle supported by the chassis.

Referring to FIG. 3, the inductor of the stator comprises, as with the retarder shown in FIG. 2, two coils 21, 22 disposed on either side of web 2 made of ferromagnetic material to which overlapped pole pieces are attached which form two cylindrical pole zones of pole faces over which rings 25, 26 fit in which the eddy current are set up.

Figure 6:
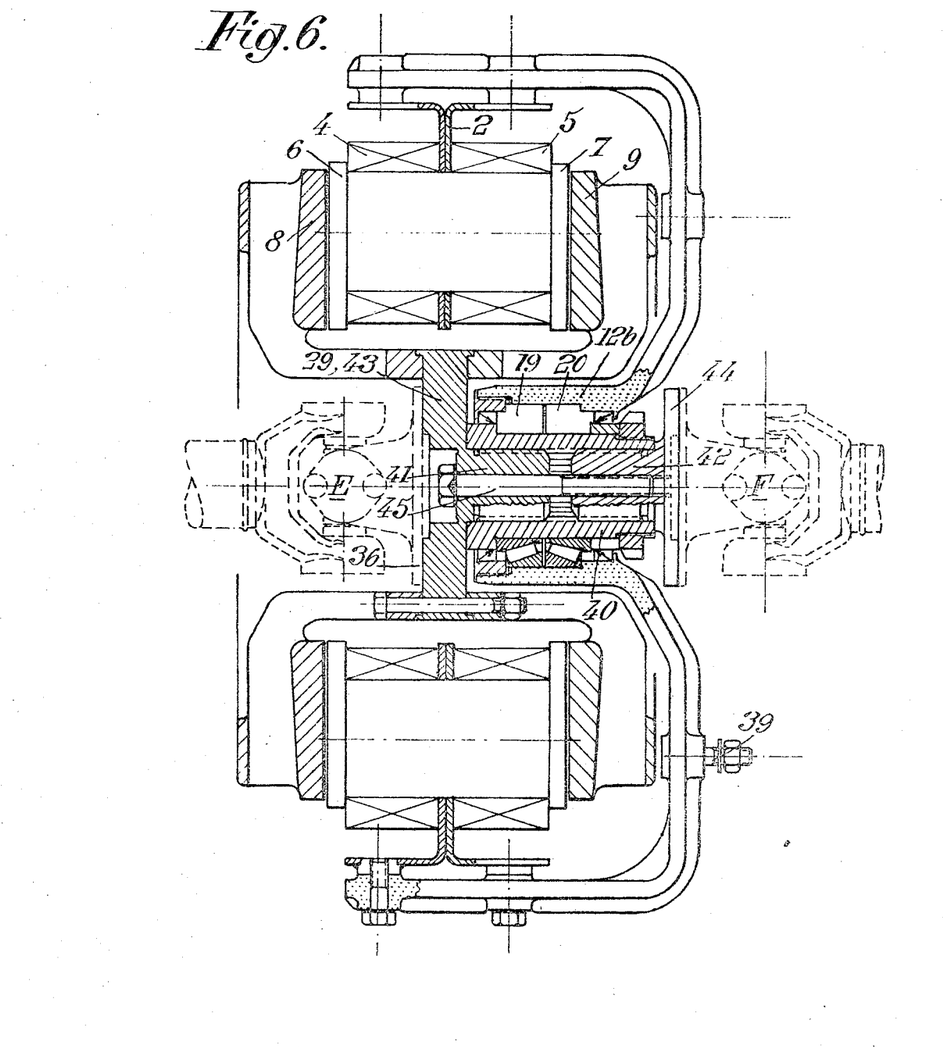
FIG. 6 is a view in axial section of yet another form of retarder according to the invention.

The inductor of the stator shown in FIG. 4 comprises a ring of electromagnets 31 whose windings are paraxial with the rotor and which are each disposed between two pole pieces 32, 33 disposed opposite the discs 8, 9 of the rotor. The electromagnets are supported by a dished member 34, made, for instance, of rust-resistant steel, attached to arms 35 of the support 30 and inserted between the winding of each electromagnet the pole piece 33 thereof, which is disposed on the same side as the support 30, in relation to the central plane of the retarder. Of course, instead of a single ring of electromagnets, two rings of electromagnets could be provided, as shown in FIG. 6, the rings being disposed on either side of a plate 6 which in this case is attached to an arm 35 of the support.

Clearly, in the two retarders shown in FIGS. 3 and 4, due to the fact that the shaft of the rotor D and the bush 12b are disposed on only one side of the plate 29, the recess B inside the rotor element shown on the left-hand side in the drawing is deep enough to receive substantially the whole of a universal joint E which is attached by a plate 36 directly to the plate 29 to which the rotor elements are attached.

The retarder construction shown in FIGS. 3 and 4 also reduce to the minimum the increased length of the transmission due to the insertion of the retarder.

Figure 5:
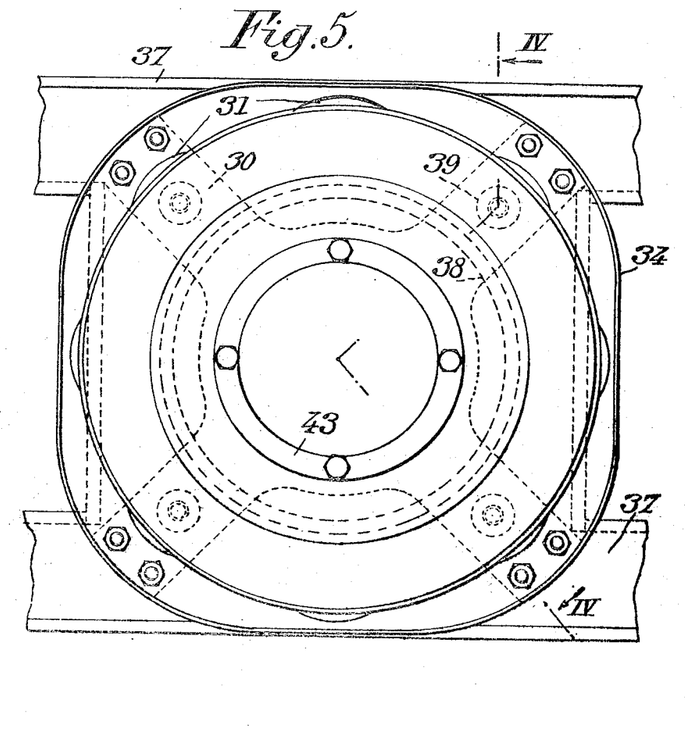
FIG. 5 is an end elevation view of the retarder of FIG. 4.

The support 30 can be attached to the chassis, for instance, of a vehicle, in many ways. For instance, the support can be attached between two longitudinal members of the frame extending parallel with the transmission on either side of the retarder. Alternatively, the retarder can be attached to two superimposed transverse members of the chassis or to a single transverse member 37 formed with a passage 38 for the transmission (see FIG. 5). The latter method of the attachment is performed, for instance, by means of screw-threaded bolts 39, as shown in FIGS. 4 and 5. The retarder shown in FIG. 3 is attached in a similar manner. Clearly, the retarder can be attached in any other way, the attachment being adapted to the needs in each particular case.

In the embodiments of FIG. 3 and FIG. 4 the rotor shaft is formed by a tubular member 40 splined to receive correspondingly splined plugs 41, 42 which enter the member 40 at opposite ends thereof. Alternatively, the plugs 41, 42 can be screwed into the body 40. The plugs 41, 42 are formed with flanges 43, 44 at their outer ends 40; the flange 43 of the plug 41 forming the plate 49. The flange 44 of the other plug acts as an attaching plate for a universal joint F, while the universal joint E is attached to the flange plate 43, 29. The two plugs 41, 42 are also interconnected by a screw-threaded bolt 45. The result is a very compact and strong construction of the retarder shaft, which is able to transmit the forces exerted on the transmission containing the retarder, without any danger of breakage.

Figure 7:
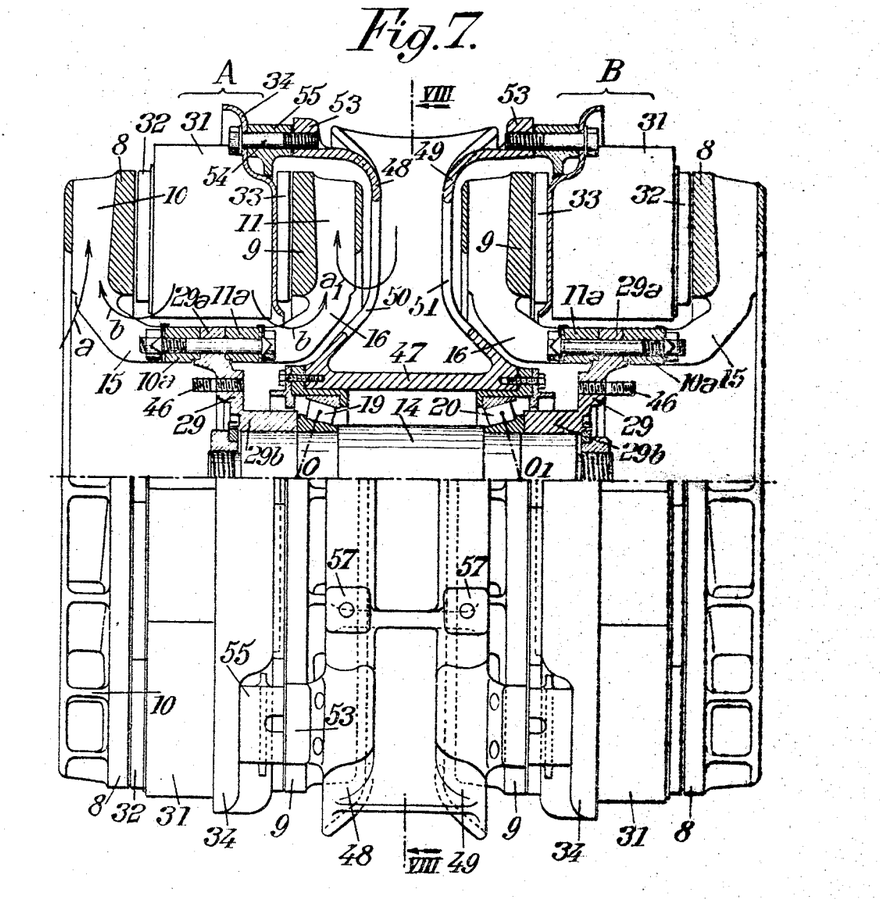
FIG. 7 shows, half in axial section half in elevation, yet another form of retarder according to the invention.
Figure 9:
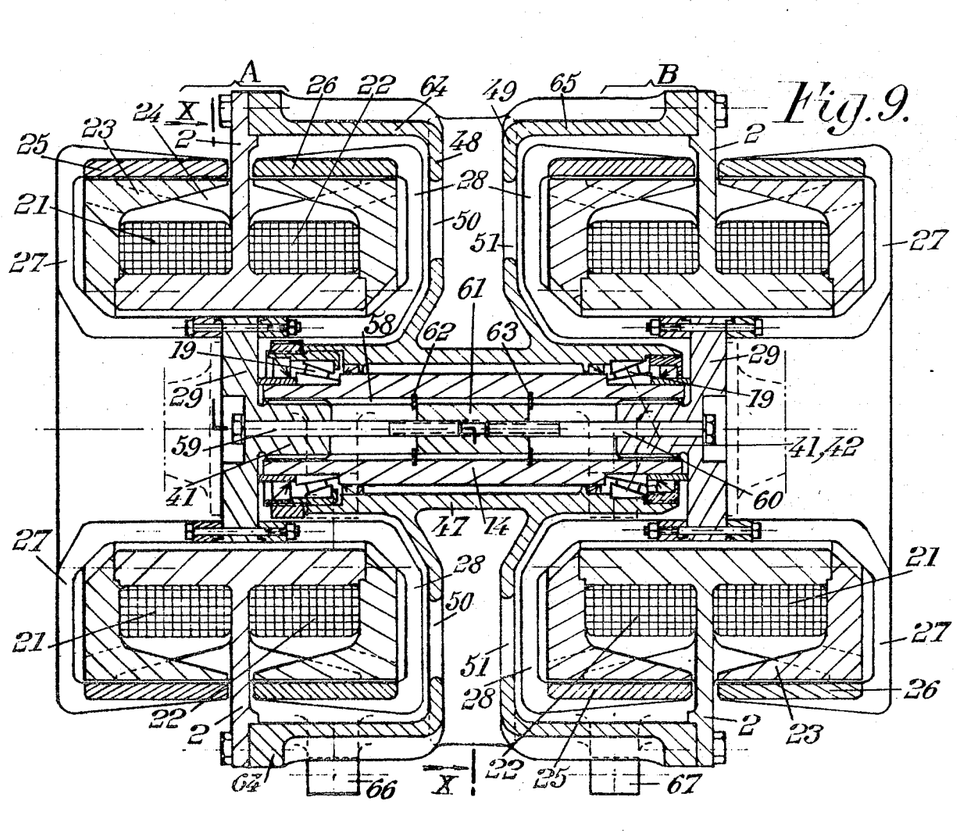
FIG. 9 shows a yet further embodiment sectioned along the line IX–IX in FIG. 10.

In the embodiments of FIGS. 7 and 9, two inductors and corresponding rotor elements are combined to obtain retarders adapted to develop a very braking torque which are no larger transversely than the single retarder shown in FIGS. 1 to 6, and which add no more to the length of the transmission than known single retarders.

Figure 8:
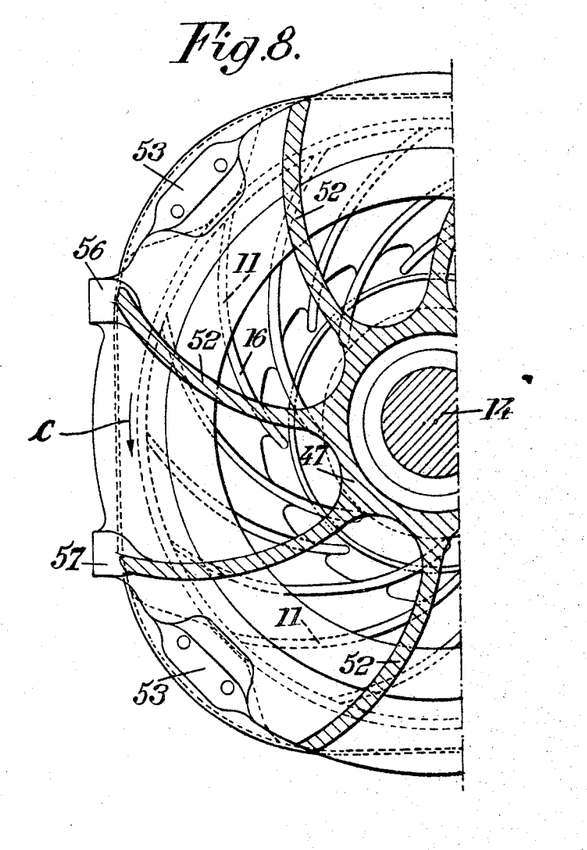
FIG. 8 is a section, taken along the line VIII–VIII in FIG. 7.

The retarders shown in FIGS. 7 and 8 is formed, in effect, by two single retarders similar to that shown in FIG. 4. In FIGS. 7 and 8 like elements to those used in FIG. 4 have like references. The bent arms 15, 16 of each of the single retarders are connected to annular hubs 10a, 11a which are attached on either side of the periphery 29a of a plate 29, each of these plates being attached by a sleeve 29b to one of the ends of the shaft 14 of the double retarder. Seeing that an annular opening interrupted only by the arms 15 or 16 (of which only those in the plate of the section are shown in the upper portion of FIG. 7) exists between the inner edge of the discs 8, 9 and the outer edge of the hubs 10a, 11a, the ventilating fins 10, 11 suck in air not only from the ambient air in the direction indicated by the arrows a, but also from inside the retarder, through the gaps between the windings of the electromagnets 31, in the direction indicated by the arrows b, to throw this air radially outwards.

Each plate 24 is dished so that the periphery 29a is offset outwards in relation to the plate 29, to further increase the free recess inside the bent arms 15. These recesses can receive the coupling plate and universal joint of a shaft forming part of the transmission in which the retarder is to be inserted. To attach these transmission elements to the retarder, screw-threaded bolts are screwed into the plate 29.

The double-retarder shaft 14 is journaled with the interposition of thrust bearings, in a bush 47 whose ends enter the recesses between the arms 16 of the two juxtaposed retarders, the bush 47 being supported by a central portion of the stator — i.e., by a portion which extends radially along the plane of symmetry VIII–VIII of the double retarder and to which the annular inductors of the two single retarders are attached overhung on either side of said central portion. The rollers of the taper bearings 19, 20 have the same inclinations as that of the rollers forming part of the retarders illustrated in the preceding drawings.

The central portion of the stator advantageously comprises two annular walls 48, 49 spaced out from one another and flared both in their peripheral and internal portions, the latter portion being unitary with the bush 47. The walls 48, 49 are also formed with apertures 50, 51. Thus air is sucked by the fins 11 from the outer edge of the central portion, in a substantially radial direction through the gap between the two walls 48 49 and then passes through the apertures 50, 51, passing around the inner edge of the annular plates 11b, to be finally ejected radially by the fins 11. The arrows $a_1$ shown the whole of this path in FIG. 7. The result is efficient cooling, not only of the rotor elements disposed on either side of the said central portion, but also of the latter portion itself. Advantageously, there are disposed in the gap between the two walls 48, 49 vanes 52 (see FIG. 8) having a curvature such as to impart rotation to the sucked-in air when it is passing through the central portion of the stator, this prerotation being in a direction such as to diminish the impact of the air on the fins 11. FIG. 8 shows the curvature of the vanes 52, the preferred curvature of the fins 11, and the direction of rotation of the retarder rotor, the latter being shown by the arrow c. The outer portions of the walls 48, 49 are formed with attaching claws 53 to which the plate 34 is connected by means of screw-threaded bolts 54 extending through strut members 55 interposed between the plate 34 and its attaching claws.

To attach the retarder formed by the two single retarders to the vehicle chassis, the outer edge of the walls 48, 49 is also provided with reinforced attaching points 56, 57. The retarder assembly can therefore be attached to the chassis in a manner completely similar to conventional retarders.

For a single cold retarder to produce a predetermined torque $C_f$, its windings must be energized by a predetermined power P, depending on the number of turns of the windings. The torque $C_f$ is often about twice the braking torque $C_{ch}$ which the same retarder develops with the same energization when it has reached its maximum permissible temperature after the braking period has lasted for some time. However, if a double retarder is used such as that shown in FIGS. 7 and 8, a much higher braking torque is obtained both when the retarder is cold and hot, for the same energizing power.

Figure 10:
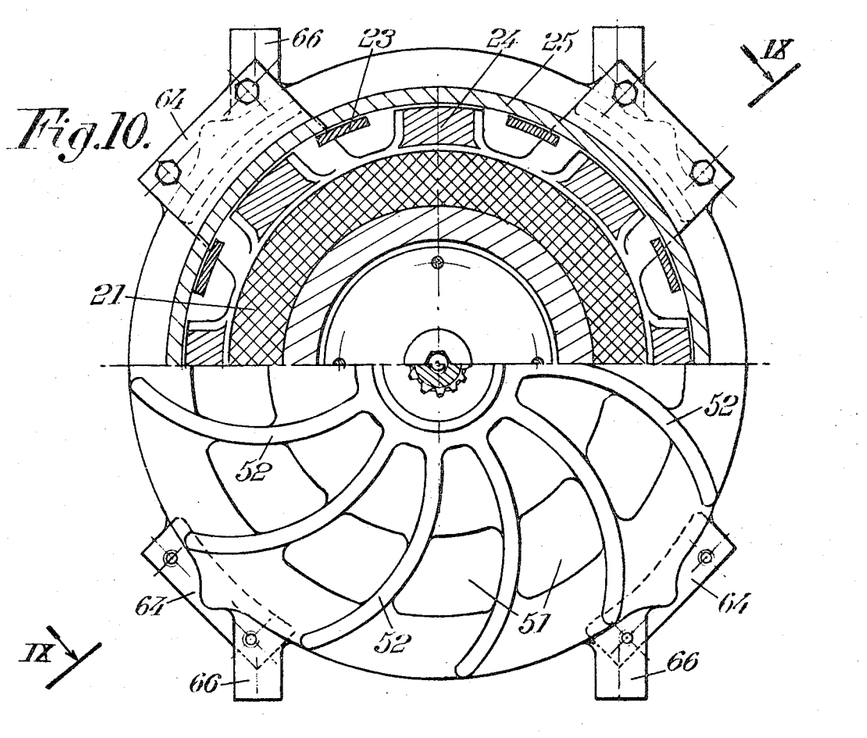
FIG. 10 is a view half in end elevation and half in section through the retarder of FIG. 9, taken along the line X–X in FIG. 9.

FIGS. 9 and 10 show a double retarder made up of two single retarders similar to that shown in FIG. 3. In FIGS. 9 and 10, like elements to those in FIGS. 2 and 3 have like references. The plates 29 of the two single retarders comprise on the side facing the plane of symmetry of the retarder, continuations forming plugs 41, 42 which enter a bore in a shaft 14, where they are made rigid for corotation with the shaft 14 by splines 58. The plates 29, with their plugs 41, 42, are attached by bolts 59, 60 to a screw-threaded bush 61 which is splined in the bore of the shaft 14, and whose axial position inside the shaft 14 is fixed by circlips 62, 63.

The central portion of the double retarder, of which the bush 47 in which the shaft 14 is journaled forms part, is constructed in a similar way to the central portion shown in FIGS. 7 and 8. Attached to this central portion by means of arms 64, 65 are the partitions 2 of the two single retarders.

The arms 64, 65 have attaching claws 66, 67 by means of which the stator of the retarder assembly can be attached to the chassis of a vehicle.

The retarder shown in FIGS. 9 and 10 has the same advantages as that shown in FIGS. 7 and 8 — i.e., for a given energization the retarder produces a much higher braking torque than a single retarder energized to the same extent, although the space occupied transversely by the retarder is the same as that of a single retarder of the same kind, and the length of the portion by which it is to be inserted into a transmission is reduced to the minimum.

In a further variant (not shown), the retarder is not an eddy current retarder, but a hydraulic retarder whose rotor elements are on either side of a stator element with which they are in functional relation.

I claim:

1. A self-contained retarder comprising:
   a stator having a bore in a central portion thereof and including an annular portion;
   taper roller bearings adjacent opposite ends of said bore;
   a shaft rotatably mounted within said bore by means of said taper roller bearings;
   the rollers of each bearing having their rotary axes inclined towards the rotary axis of said shaft towards the other bearing;
   a rotor fixed to said shaft and having two rotor elements disposed axially on opposite sides of said stator annular portion;
   said central portion of the stator having at least one axially extreme end offset axially inwardly from the position of the adjacent axial end of said annular portion to provide a central recess at the corresponding end of the stator;
   coupling means on opposite ends of said shaft for connection to a transmission, the coupling means adjacent said end of the stator lying within said recess; and
   at least one connecting member connecting the coupling means lying within said recess to the rotor element adjacent said end of the stator, said at least one connecting member being bent into said recess in the stator to define a corresponding recess in the rotor to accommodate part of a transmission connected to said coupling means.

2. A self-contained retarder as claimed in claim 1 in the form of an eddy current retarder, said annular portion of the stator comprising an electromagnetic inductor for producing, when activated, eddy currents in said rotor elements.

3. A self-contained retarder as claimed in claim 2 wherein said inductor comprises a plurality of electromagnets disposed regularly about the axis of said shaft with sets of poles at axially extreme ends of said annular portion and said rotor elements each comprise an annular disc opposed to one set of poles.

4. A self-contained retarder as claimed in claim 3 wherein said inductor comprises two annular coils coaxial with said shaft and each accommodated in an annular recess in the stator defined between a plurality of overlapping pole fingers on the outer circumference of said annular member, and said rotor elements each comprise a cylindrical band encircling the annular portion of the stator.

5. A self-contained retarder as claimed in claim 1 wherein the coupling means adjacent said end of the stator comprises a member of diameter greater than said bore said at least one connecting member connecting the rotor elements to said coupling means being attached to said coupling member at positions outwith the diameter of said bore.

6. A self-contained retarder as claimed in claim 1 in which the axial length of said bore is substantially equal to the sum of the axial lengths of said taper roller bearings.

7. A self-containing retarder as claimed in claim 1, in which said coupling member comprises a plate fixed to one end of said shaft substantially in the central plane of said annular portion, both rotor elements being attached to said plate by similar connecting members, to define a similar recess at opposite ends of the rotor, said bore in the stator being formed by a bush extending into one of said recesses and the other of said recesses being arranged to accommodate a transmission.

8. A self-contained retarder as claimed in claim 7, in which said bush is integral with a support extending around the adjacent rotor element which support also supports said annular portion of the stator.

9. A self-contained retarder as claimed in claim 7, in which the rotor shaft is formed by a tubular member rigidly connected with two plugs each of which extend into the tubular member from one end thereof, one of the plugs supporting said coupling plate at its end extending beyond the tubular member while the other plug supports a further coupling plate at its end extending beyond the tubular member.

10. A self-contained retarder as claimed in claim 2, wherein the stator comprises two such annular portions mounted coaxially and each providing such a recess at one end of the stator and each arranged between a corresponding pair of rotor elements, the rotor elements of each pair being connected by similar connecting members to a plate which is substantially in the central plane of the corresponding annular portion of the stator and is attached at one end of a common shaft which is supported by said central portion of the stator, which extends radially between the two annular portions of the stator, the arrangement being such that a corresponding recess for the accommodation of part of a transmission is formed at both ends of the retarder.

11. A self-contained retarder as claimed in claim 10, in which the central portion of the stator comprises two substantially radial walls spaced apart axially and which are formed with apertures so that the rotor elements, which are disposed on either side of said central portion and have cooling and ventilating fins, can suck air from the gap between the two walls, this gap communicating with the ambient air at the periphery of said central portion.

12. A self-contained retarder as claimed in claim 11, in which curved vanes are disposed between the walls of the central portion and are arranged to impart rotation to the air which is sucked into the space between the walls of the central portion.

13. A self-contained retarder as claimed in claim 12, in which the vanes and the fins have curvature such that their convex sides are directed away from the direction of rotation of the rotor.

14. A self-contained retarder claimed in claim 7, in which said coupling plate is dished so that the outer edge of the plate is displaced axially inwardly with respect to the center of the plate.

15. A self-contained retarder as claimed in claim 1, in which said corresponding recess in the rotor is large enough to accommodate at least one universal joint member, and a coupling plate unitary with the retarder shaft and comprising said coupling means.